United States Patent
Furutani

(10) Patent No.: US 8,699,060 B2
(45) Date of Patent: Apr. 15, 2014

(54) IMAGE READING APPARATUS AND IMAGE FORMING APPARATUS

(75) Inventor: Hiroshi Furutani, Osaka (JP)

(73) Assignee: Kyocera Mita Corporation (JP)

( * ) Notice: Subject to any disclaimer, the term of this patent is extended or adjusted under 35 U.S.C. 154(b) by 663 days.

(21) Appl. No.: 12/947,079

(22) Filed: Nov. 16, 2010

(65) Prior Publication Data

US 2011/0122430 A1    May 26, 2011

(30) Foreign Application Priority Data

Nov. 20, 2009    (JP) ................................ 2009-264647

(51) Int. Cl.
*H04N 1/00* (2006.01)

(52) U.S. Cl.
USPC ....... 358/1.15; 358/400; 358/444; 379/93.02; 379/93.03

(58) Field of Classification Search
USPC .............. 358/1.13, 1.15, 1.16, 442, 444, 401, 358/400; 379/93.02, 93.03
See application file for complete search history.

(56) References Cited

U.S. PATENT DOCUMENTS

| | | | |
|---|---|---|---|
| 2008/0019593 A1 | 1/2008 | Kashiwagi et al. | |
| 2008/0060070 A1 | 3/2008 | Uno | |
| 2008/0062471 A1 | 3/2008 | Matsuda | |
| 2008/0079995 A1* | 4/2008 | Tsuji et al. | 358/1.15 |
| 2009/0225352 A1* | 9/2009 | Nakajima | 358/1.15 |

FOREIGN PATENT DOCUMENTS

| | | |
|---|---|---|
| CN | 101068272 | 11/2007 |
| JP | 4-181867 | 6/1992 |
| JP | 2009239423 | 10/2009 |

* cited by examiner

*Primary Examiner* — King Poon
*Assistant Examiner* — Lawrence Wills
(74) *Attorney, Agent, or Firm* — Gerald E. Hespos; Michael J. Porco; Matthew T. Hespos

(57) ABSTRACT

In the case of transmitting an image data, a controller causes a re-destination storage to store an identification number of a destination. Thereafter, when a user presses a re-destination key long, a display controlling section causes a display device to display a confirmation screen to let the user confirm whether or not to delete the identification number stored as a re-destination. If the user depresses an OK key, a re-destination deleting section deletes the identification number stored in the re-destination storage.

7 Claims, 14 Drawing Sheets

FIG.9

| FAX NUMBER | DELETION NUMBER |
|---|---|
| 03-1234-5678 | 1 |
| 06-1234-5678 | 3 |
| 08-1234-5678 | 2 |
| ⋮ | ⋮ |

| FAX NUMBER | DELETION NUMBER | USER NAME |
|---|---|---|
| 03−1234−5678 | 1 | ABC |
| 06−1234−5678 | 3 | PQR |
| 08−1234−5678 | 2 | XYZ |
| ⋮ | ⋮ | ⋮ |

~722

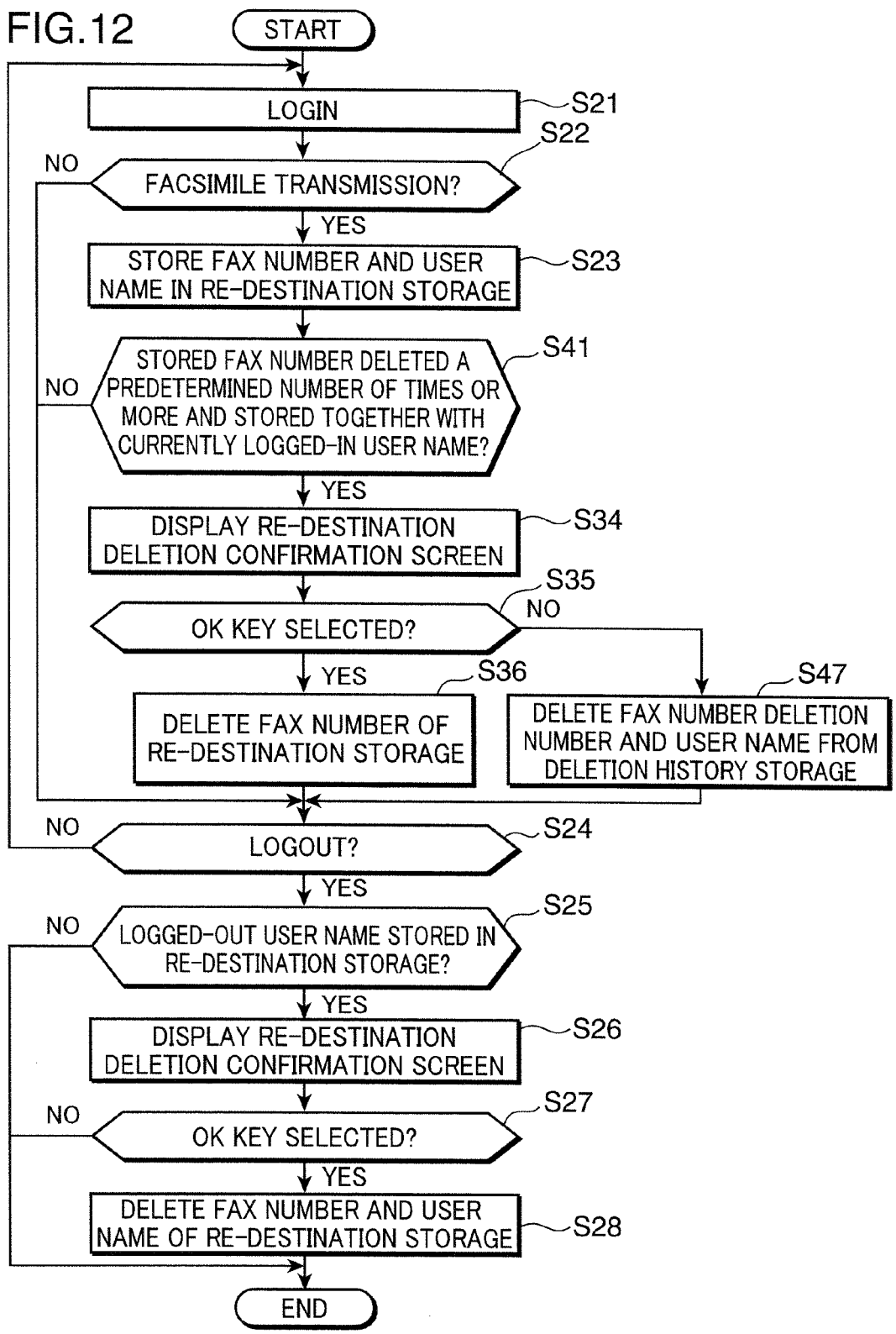

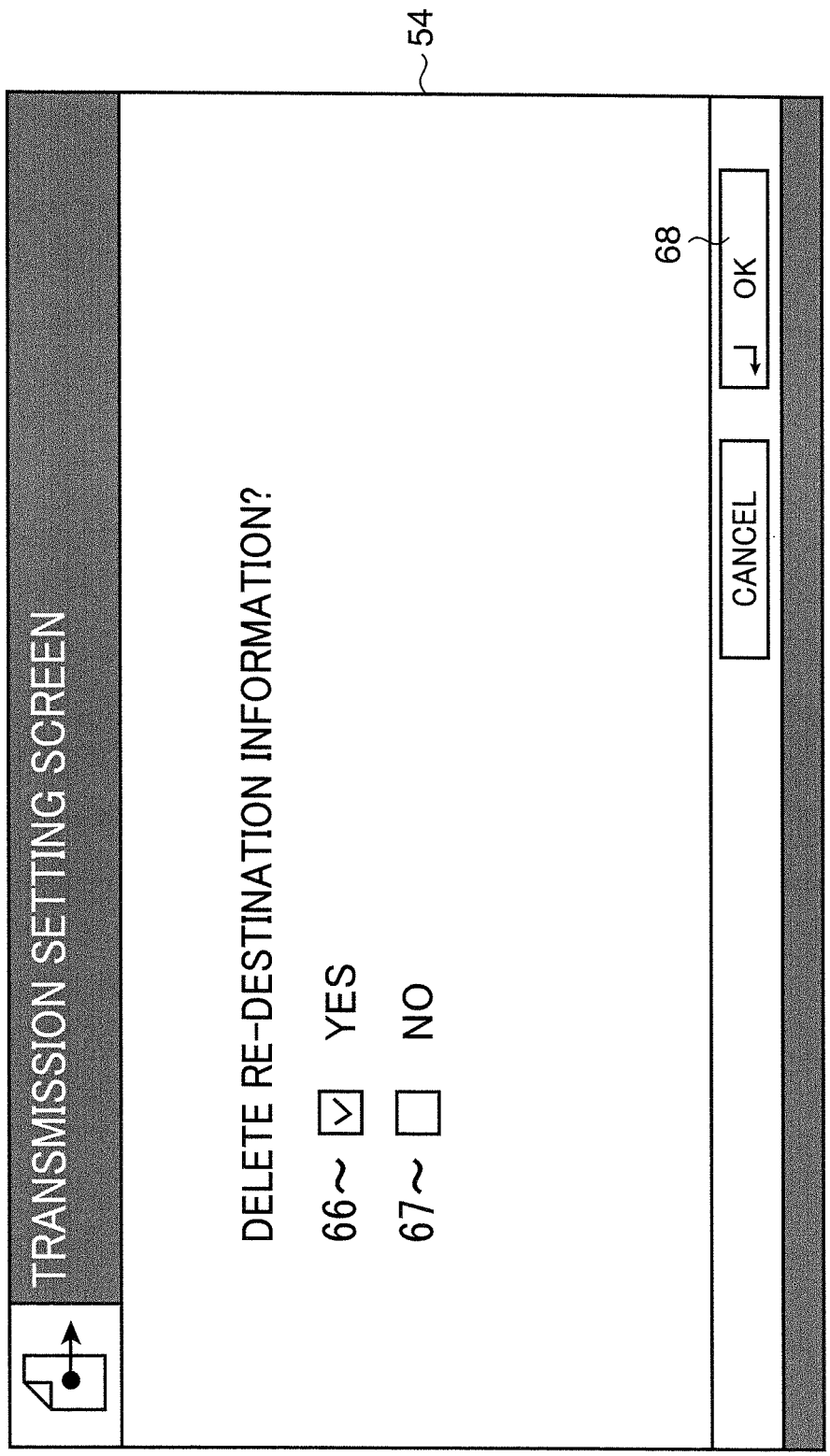

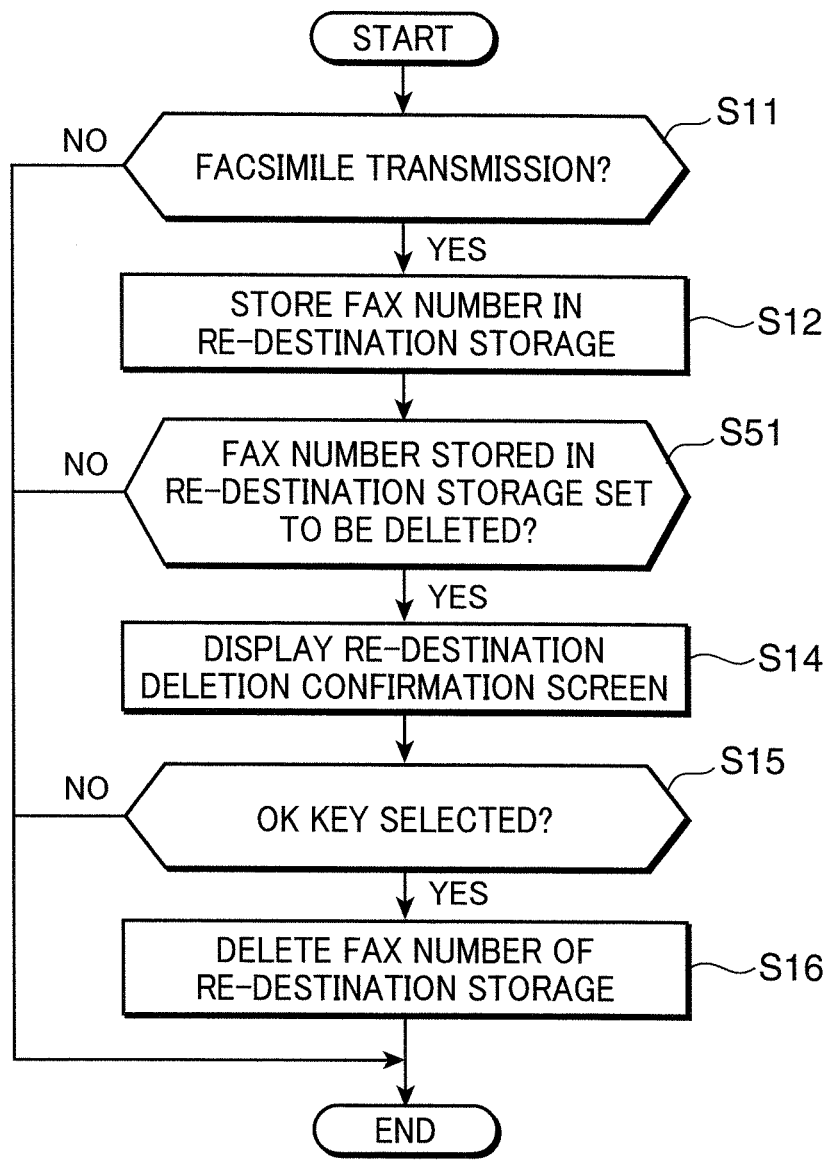

IMAGE READING APPARATUS AND IMAGE FORMING APPARATUS

BACKGROUND OF THE INVENTION

1. Field of the Invention

The present invention relates to an image reading apparatus and an image forming apparatus capable of transmitting a read image to an external apparatus.

2. Description of the Related Art

Image reading apparatuses provided with a scanner function for obtaining an image data by reading an image of a document and a facsimile function and a mail function for transmitting the obtained image data to an external apparatus are widely spread. Many of such image reading apparatuses include a re-destination key for easily reading a facsimile number or a mail address (identification information) of a destination to which facsimile transmission or mail transmission was performed most recently. A known prior art is such that an entered dial number is stored in a storage and, if a predetermined input is made, the dial number is read from the storage and easily redialed.

SUMMARY OF THE INVENTION

The present invention is a further improvement of the above conventional invention.

Specifically, the present invention is directed to an image reading apparatus, comprising a reading unit that reads a document image to obtain an image data; an identification information receiving unit that receives an input of identification information of an external apparatus as a destination of the image data; a transmission unit that transmits the image data to the external apparatus indicated by the identification information received by the identification information receiving unit; a re-destination storage that stores the identification information used for the image data transmission to the external apparatus by the transmission unit as a destination candidate of next image data transmission by the transmission unit; and a deleting section that deletes the identification information stored in the re-destination storage when a predetermined condition is satisfied.

Objects, features and advantages of the present invention will become more apparent upon reading the following detailed description along with the accompanying drawings.

BRIEF DESCRIPTION OF THE DRAWINGS

FIG. 9 is a view showing an example of a data configuration of a deletion history storage in a third embodiment.

FIG. 11 a view showing an example of a data configuration of a deletion history storage in a fourth embodiment.

FIG. 12 is a flow chart showing the flow of a re-destination deletion process in the fourth embodiment.

FIG. 13 is a view showing an example of an initial setting screen.

FIG. 14 is a flow chart showing the flow of a re-destination deletion process in a fifth embodiment.

DETAILED DESCRIPTION OF THE PREFERRED EMBODIMENTS

Hereinafter, embodiments of an image forming apparatus according to the present invention are described with reference to the accompanying drawings.

First Embodiment

Figure 1:
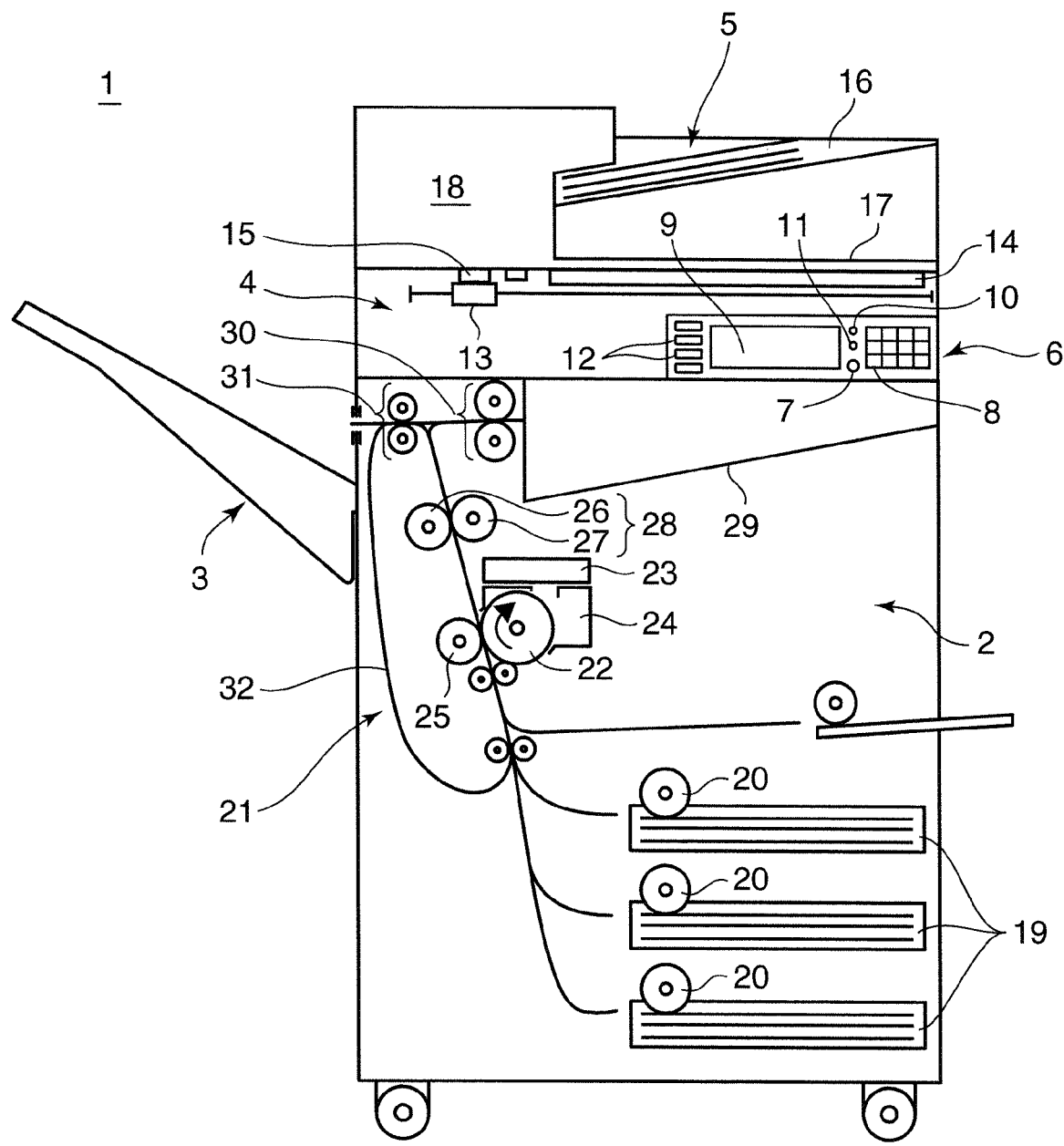
FIG. 1 is a side view schematically showing an internal construction of an image forming apparatus.

FIG. 1 is a side view schematically showing an internal construction of an image forming apparatus 1 according to one embodiment of the present invention. The image forming apparatus 1 is provided with a copy function, a printer function, a scanner function, a facsimile function and the like and includes a main body 2, a stack tray 3 arranged on a left side of the main body 2, a document reader 4 arranged in an upper part of the main body 2 and a document feeder 5 arranged above the document reader 4. Note that it is sufficient for the image forming apparatus 1 to have at least a function for transmitting an image data obtained by using the scanner function or the like to an external apparatus and the image forming apparatus 1 may, for example, be a facsimile machine.

An input operation unit 6 is provided on a front side of the image forming apparatus 1. This input operation unit 6 includes a start key 7 used by a user to input a print instruction, a numerical pad 8 used to input the number of print copies and the like, a display device 9 composed of a liquid crystal display, adapted to display operation guide information and the like for various copying operations and having a touch panel function for the input of various settings, a reset key 10 used to reset set contents and the like set on the display device 9, a stop key 11 used to stop operations executed, function switch keys 12 used to switch the function between the copy function, the printer function, the scanner function and the transmission function.

The document reader 4 includes a scanner 13 composed of a CCD (Charge Coupled Device) sensor, an exposure lamp and the like, a document platen 14 made of a transparent member such as glass and a document reading slit 15. The scanner 13 is constructed to be movable by an unillustrated driver and, when reading a document placed on the document platen 14, the scanner 13 is moved along a document surface at a position facing the document platen 14 and outputs an obtained image data to a controller to be described later while scanning a document image. When reading a document fed by the document feeder 5, the scanner 13 is moved to a position facing the document reading slit 15, obtains an image of the document via the document reading slit 15 in synchronism with a document feeding operation by the document feeder 5 and outputs its image data to the controller.

The document feeder 5 includes a document placing portion 16 used to place a document, a document discharging portion 17 onto which a document having an image thereof already read is discharged, and a document feeding mechanism 18 adapted to feed documents placed on the document placing portion 16 one by one, convey them to the position facing the document reading slit 15 and discharging them to the document discharging portion 17 and including a feed roller, conveyor rollers (not shown) and the like.

The document feeder 5 is so rotatably mounted on the main body 2 that a front side thereof is movable upward. By exposing the upper surface of the document platen 14 by moving the front side of the document feeder 5 upward, a document to be read, e.g. two facing pages of a book, can be placed on the upper surface of the document platen 14.

The main body 2 includes a plurality of sheet cassettes 19, feed rollers 20 for feeding sheets one by one from the sheet cassettes 19 and conveying them to an image forming unit 21, and the image forming unit 21 for forming an image on a sheet conveyed from the sheet cassette 19.

The image forming unit 21 includes an optical unit 23 for exposing a photoconductive drum 22 with light by outputting a laser beam or the like based on an image data obtained by the scanner 13 to form an electrostatic latent image on a surface of the photoconductive drum 22, a developing unit 24 for forming a toner image by attaching toner to the surface of the photoconductive drum 22 where the electrostatic latent image is formed, a transfer unit 25 for transferring the toner image on the photoconductive drum 22 to a sheet, a fixing device 28 including a fixing roller 26 and a pressure roller 27 for fixing the toner image to the sheet by heating the sheet having the toner image transferred thereto, and conveyor roller pairs 30, 31 disposed in a sheet conveyance path in the image forming unit 21 for conveying the sheet to the stack tray 3 or a discharge tray 29, etc.

In the case of forming images on both sides of a sheet, after an image is formed on one side of the sheet in the image forming unit 21, this sheet is nipped by the conveyor roller pair 30 closer to the discharge tray 29. In this state, the pair of conveyor rollers 30 are rotated in reverse directions to switch the sheet back, the sheet is conveyed again to a side upstream of the image forming unit 21 along a sheet conveyance path 32, and discharged onto the stack tray 3 or the discharge tray 29 after having an image formed on the other side thereof by the image forming unit 21.

Figure 2:
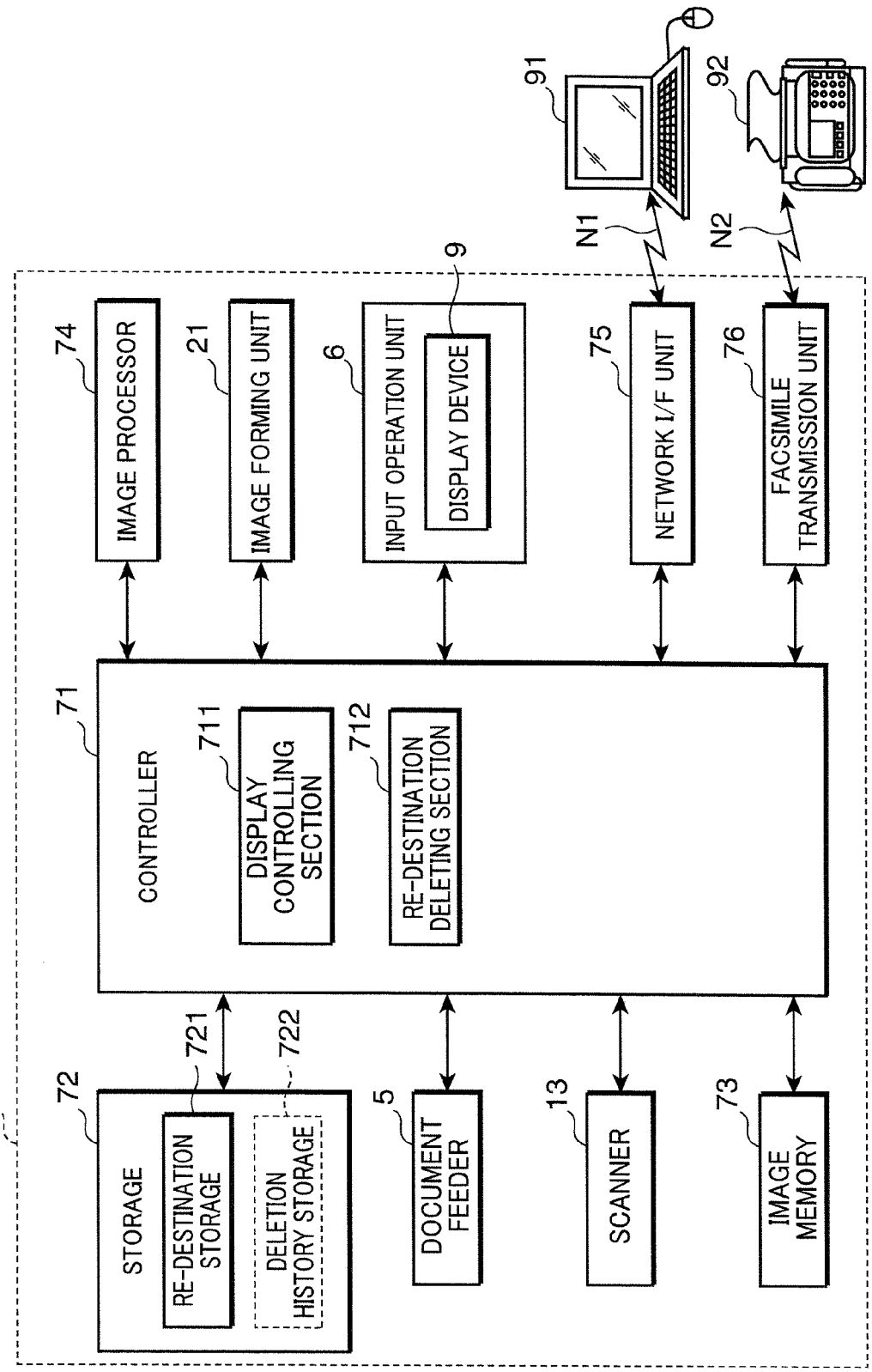
FIG. 2 is a block diagram showing an electrical construction of the image forming apparatus.

FIG. 2 is a block diagram showing an electrical construction of the image forming apparatus 1. The image forming apparatus 1 is provided with a controller 71, a storage 72, the document feeder 5, the scanner 13, an image memory 73, an image processor 74, the image forming unit 21, the input operation unit 6, a network I/F unit 75 and a facsimile communication unit 76. Note that the same constituent elements described with reference to FIG. 1 are identified by the same reference numerals and not described.

The storage 72 is for storing programs, data and the like used to realize various functions of the image forming apparatus 1, and includes a re-destination storage 721. The re-destination storage 721 is described in detail later. A deletion history storage 722 shown by dotted line is described later since it is an element used in another embodiment.

The image memory 73 temporarily stores image data obtained by the scanner 13 or those transmitted from external apparatuses such as a personal computer 91 and a facsimile machine 92 via the network I/F unit 75 and the facsimile communication unit 76. The image processor 74 applies image processings such as image corrections, size enlargement and size reduction to the image data stored in the image memory 73.

The network I/F unit 75 is a communication interface circuit for conducting communication to and from terminal units such as the personal computer 91 connected to a network N1 such as a LAN (Local Area Network) or a WAN (Wide Area Network). The facsimile communication unit 76 includes an NCU (Network Control Unit) for controlling connection of a telephone line with the facsimile machine 92 as a data transmission/reception partner, and is connected to a telephone line N2 such as a public telephone line.

The controller 71 includes a CPU (Central Processing Unit) and the like, reads and executes the programs stored in the storage 72 to centrally control the image forming apparatus 1 by outputting instruction signals to the respective functional units, transferring data, etc. The controller 71 includes a display controlling section 711 and a re-destination deleting section 712.

The display controlling section 711 executes such a control as to cause the display device 9 to display setting screens, messages to users, etc. The re-destination deleting section 712 deletes identification information (mail address, facsimile number, I.P. address or the like) stored in the re-destination storage 721 when a predetermined operation or setting is performed.

Figure 3:
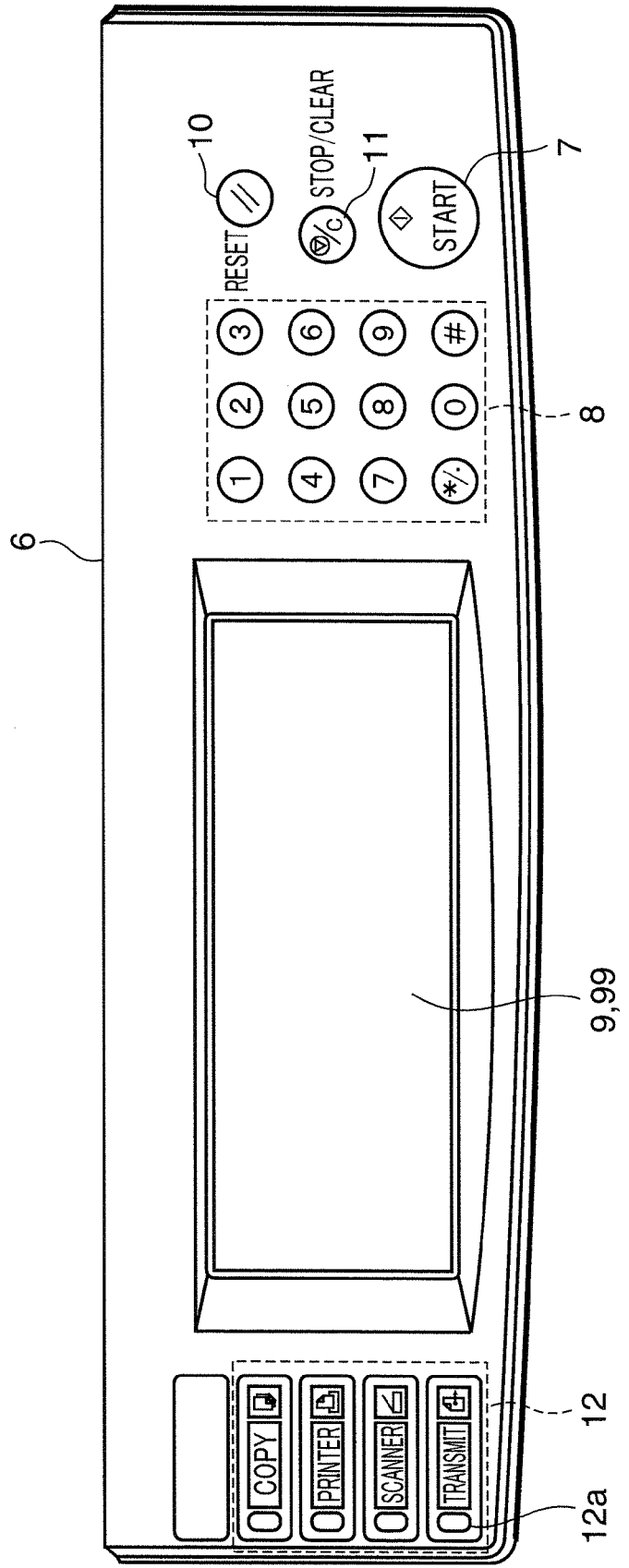
FIG. 3 is a front view of an input operation unit.

FIG. 3 is a front view of the input operation unit 6. This input operation unit 6 includes a start key 7, a numerical pad 8, the display device 9, a touch panel 99, a reset key 10, a stop key 11 and function switch keys 12. The display device 9 is composed of an LCD (Liquid Crystal Display), an ELD (Electro-Luminescent Display) or the like and selection screens for sheet size, magnification, density and the like are displayed thereon. This display device 9 is formed integrally to the touch panel 99. When being touched by a user, the touch panel 99 detects a touched position and outputs a detection signal to the controller 71.

Out of the function switch keys 12, a transmit key 12a is for transmitting an image data obtained by the scanner 13 to an external apparatus. Here, transmission in the present invention means mail transmission of an image data to a computer via Internet, image data transmission to the computer via the LAN or the like, facsimile transmission utilizing the telephone line, etc. In order to facilitate the description, the "transmission" is described below, taking facsimile transmission as an example.

Figure 4:
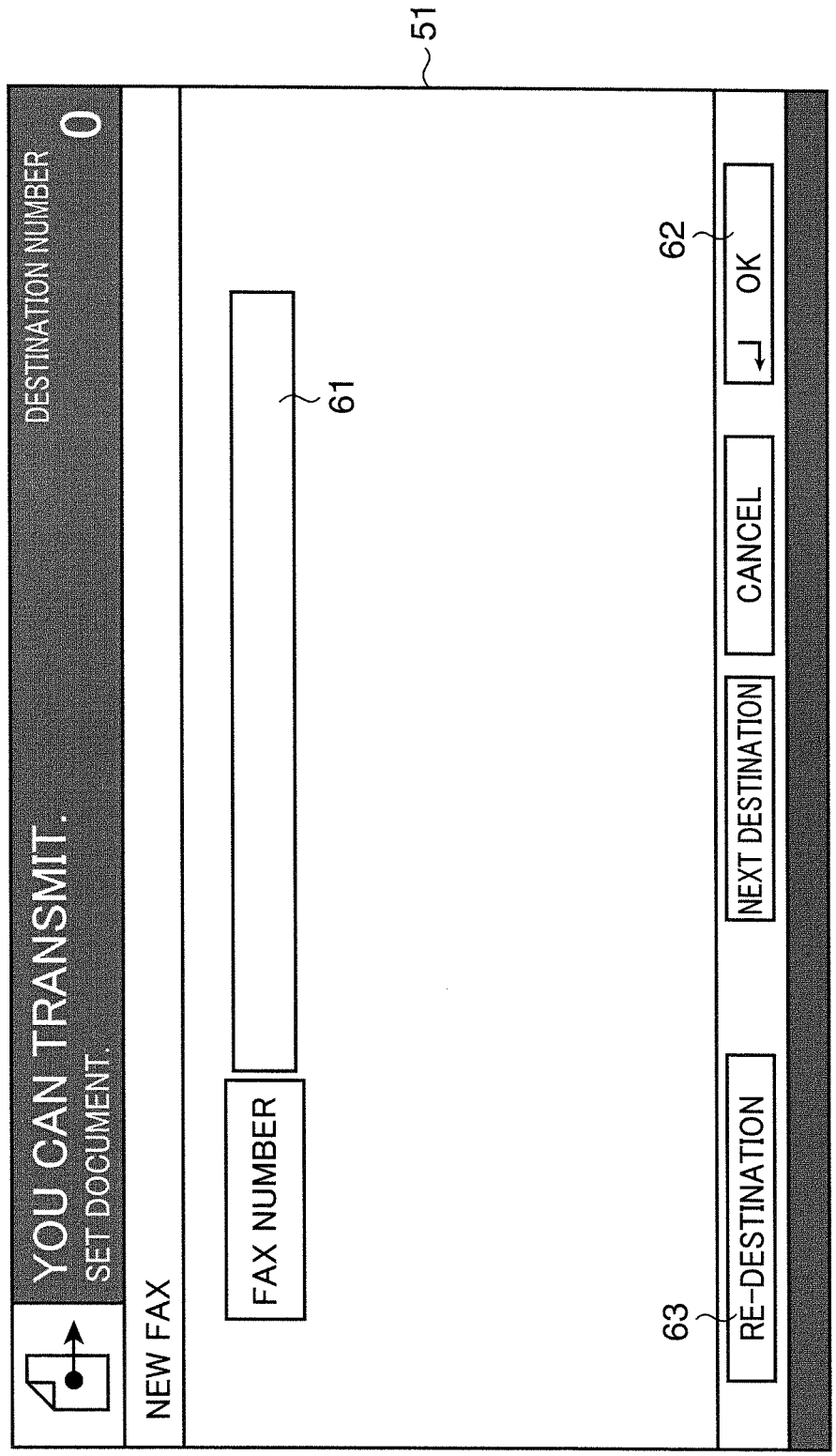
FIG. 4 is a view showing an example of a screen displayed on a display device when a transmit key is depressed.

When the user depresses the transmit key 12a, the display controlling section 711 causes the display device 9 to display a screen used to enter a fax number. FIG. 4 is a view showing an example of a screen 51 to be displayed on the display device 9 when the transmit key 12a is depressed. When the user enters a fax number of a destination via the numerical pad 8, the display controlling section 711 causes the entered fax number to be displayed in an entry field 61. Thereafter, when the user depresses an OK key 62, the start key 7 or the like, the facsimile communication unit 76 transmits an image data temporarily stored in the image memory 73 to a facsimile machine indicated by the entered fax number.

Further, when the OK key 62 or the start key 7 is depressed, the controller 71 causes the re-destination storage 721 to store the fax number entered by the user. In other words, the re-destination storage 721 stores the fax number of the destination to which facsimile transmission was most recently carried out.

A re-destination key 63 is for calling up the fax number of the destination to which facsimile transmission was most recently carried out and, when the user depresses the re-destination key 63, the controller 71 reads the fax number stored in the re-destination storage 721 and the display controlling section 711 causes this fax number to be displayed in the entry field 61. This function of calling up the fax number by the re-destination key 63 is effective, for example, when it is desired to successively carry out facsimile transmission to the same destination, and the user can easily call up the just entered fax number by depressing the re-destination key 63. In other words, it is not necessary to enter the fax number from the beginning again, whereby time and effort for the operation can be saved. However, if another user depresses the re-destination key 63 for facsimile transmission after a certain user carried out facsimile transmission, the fax number used by the previous user can be known, which has been a problem in terms of privacy and security.

Accordingly, in embodiments below, there are proposed methods by which a user can arbitrarily delete a fax number stored in the re-destination storage 721 lest the fax number of a destination, to which facsimile transmission was most recently carried out, should be displayed by the re-destination key 63. First of all, in this embodiment, there is described a method by which the re-destination deleting section 712 deletes the fax number stored in the re-destination storage 721 by operating the re-destination key 63 in a different manner (e.g. the re-destination key 63 is kept selected for a predetermined time or longer (pressed long)) from a specified operation performed when the display controlling section 711 causes the fax number stored in the re-destination storage 721 to be displayed in the entry field 61 of the display device 9.

Figure 5:
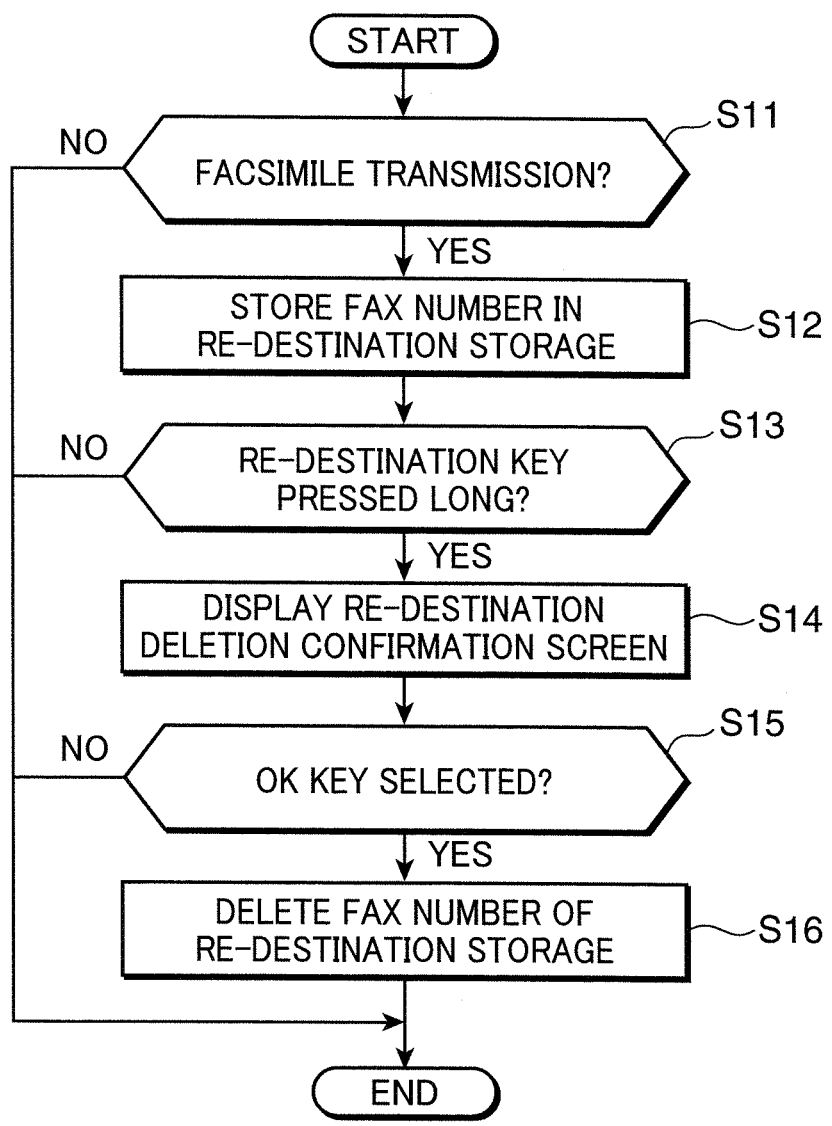
FIG. 5 is a flow chart showing the flow of a re-destination deletion process in a first embodiment.

FIG. 5 is a flow chart showing the flow of a re-destination deletion process in this embodiment. In the case of facsimile transmission (YES in Step S11), the controller 71 causes the re-destination storage 721 to store a fax number of a destination (Step S12). Thereafter, if the user presses the re-destination key 63 for a long time (e.g. if the user keeps depressing the re-destination key 63 for 2 seconds or longer) (YES in Step S13), the re-destination deleting section 712 judges that a deletion instruction for the number of the destination of the facsimile transmission has been received and the display controlling section 711 causes the display device 9 to display a confirmation screen to let the user confirm whether or not to delete the fax number stored in the re-destination storage 721 (Step S14).

Figure 6:
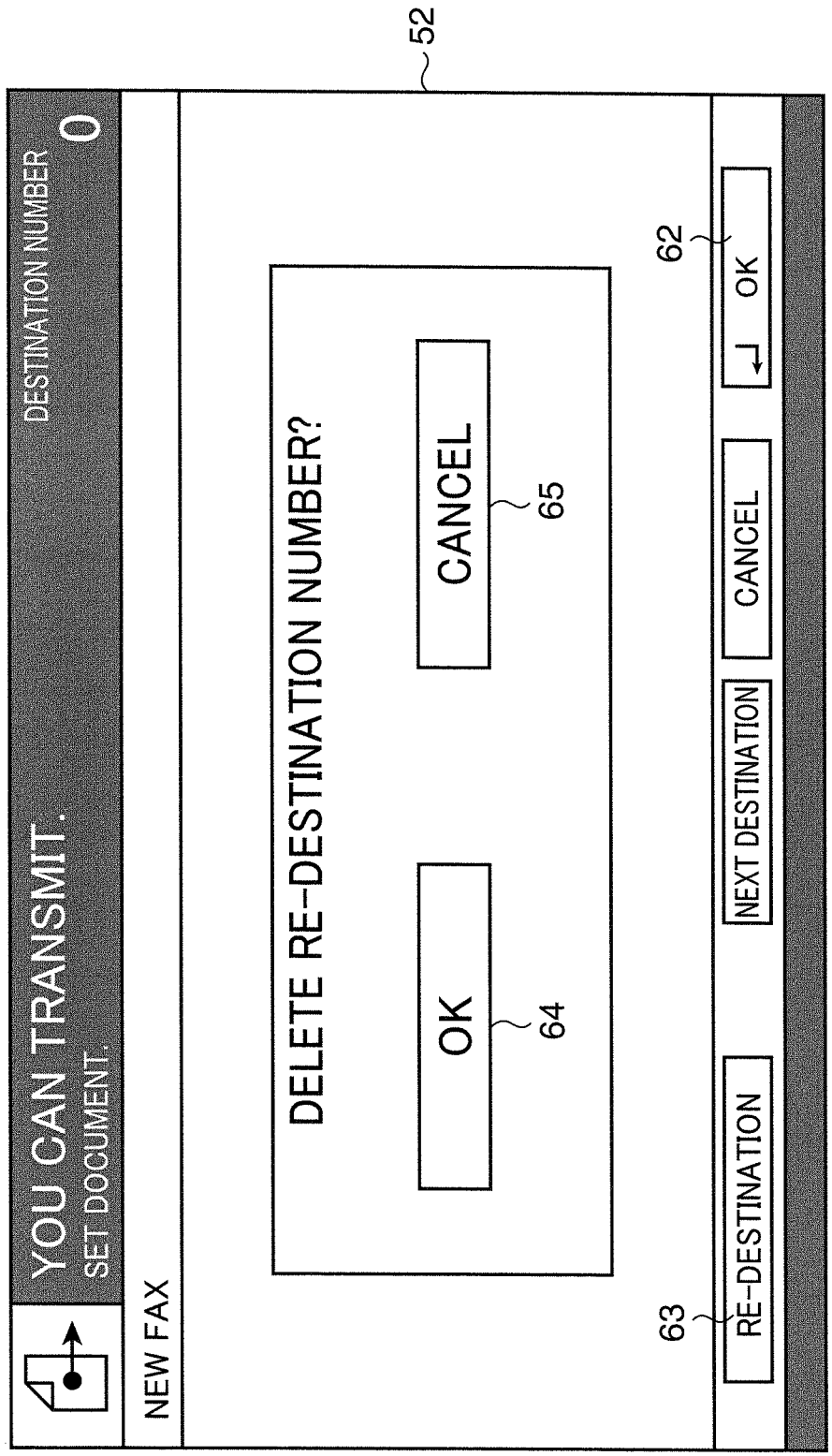
FIG. 6 is a view showing an example of a re-destination deletion conformation screen.

FIG. 6 is a view showing an example of a re-destination deletion confirmation screen 52 to be displayed on the display device 9 in Step S14. If the user depresses an OK key 64 (YES in Step S15), the re-destination deleting section 712 deletes the fax number stored in the re-destination storage 721 (Step S16). In other words, even if the user depresses the re-destination key 63 thereafter, no fax number is displayed in the entry field 61 since no fax number is stored in the re-destination storage 721.

In this way, when it is not desired to let others know the fax number of the facsimile transmission destination, the re-destination deleting section 712 deletes the fax number stored in the re-destination storage 721 if the user performs a predetermined operation such as pressing of the re-destination key 63 for a longer time. Thus, even if another user depresses the re-destination key 63 thereafter, no fax number is displayed, whereby privacy and security can be protected. By utilizing the re-destination key 63, which has been conventionally displayed, without displaying a new instruction key on the display device 9 to delete the fax number from the re-destination storage 721, it can be avoided that the display screen of the display device 9 looks more complicated.

In this embodiment, when the re-destination key 63 is pressed long, the display controlling section 711 causes the display device 9 to display the confirmation screen 52 to let the user confirm whether or not to delete the fax number stored in the re-destination storage 721. However, the re-destination deleting section 712 may delete the fax number stored in the re-destination storage 721 without this confirmation screen 52 being displayed.

Second Embodiment

In a second embodiment is described a method by which, when a user can perform a login operation of entering a user name and a password upon using an image forming apparatus 1, a re-destination deleting section 712 deletes a fax number stored in a re-destination storage 721 when a logout operation is performed. Note that an internal construction and an electrical construction of the image forming apparatus 1 according to the second embodiment are the same as those shown in FIGS. 1 and 2 and, hence, not described.

Figure 7:
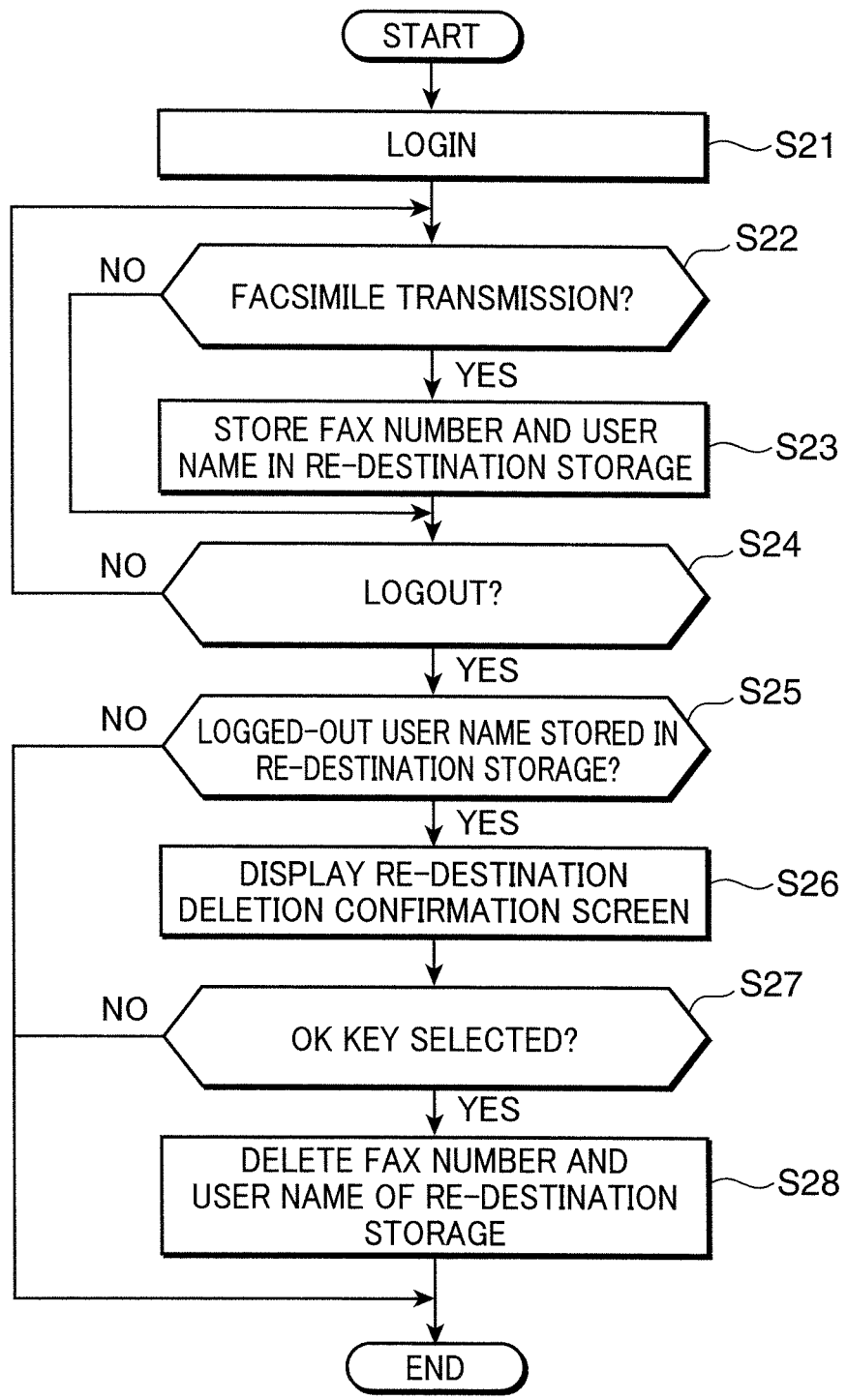
FIG. 7 is a flow chart showing the flow of a re-destination deletion process in a second embodiment.
Figure 8:
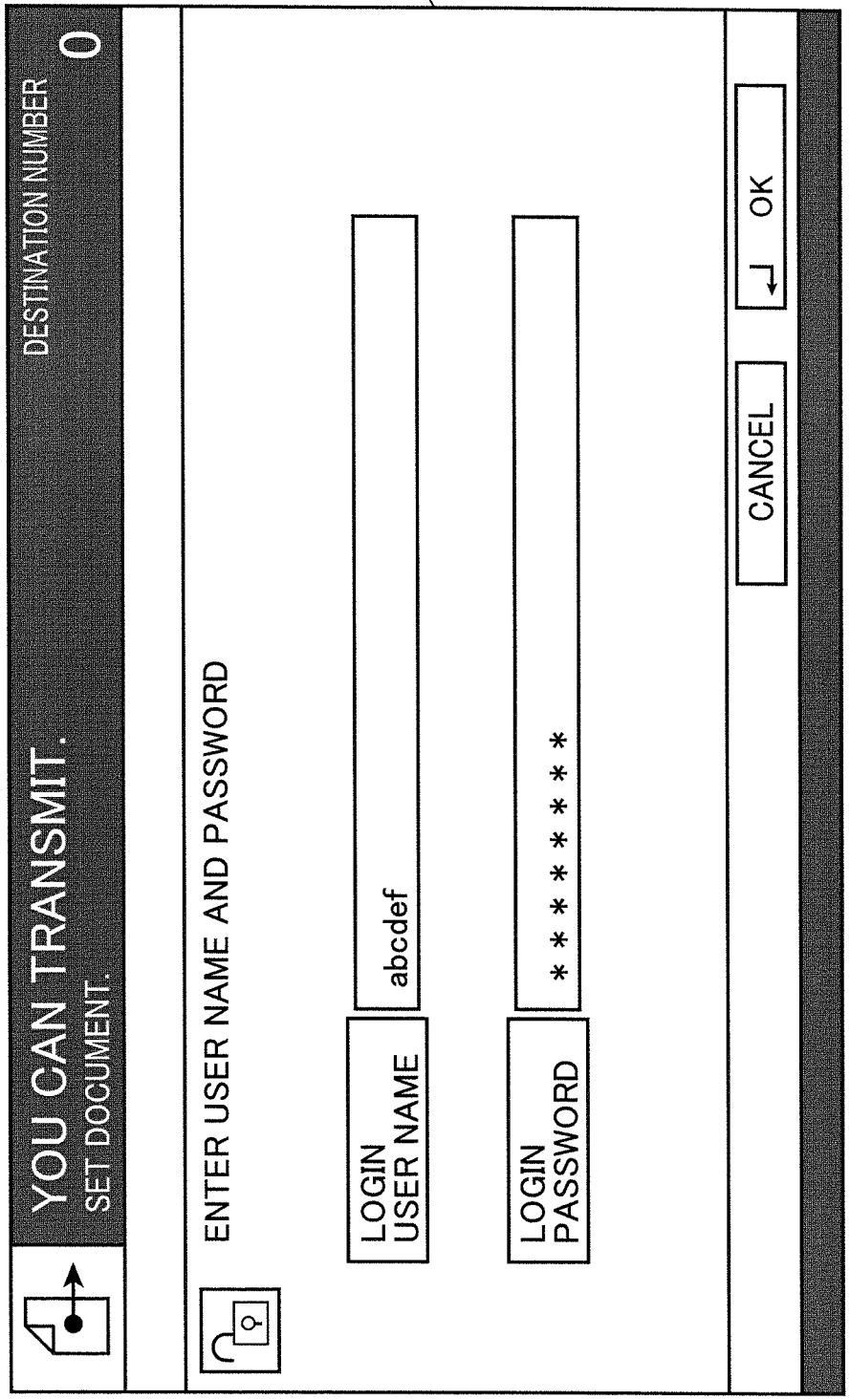
FIG. 8 is a view showing an example of a login screen.

FIG. 7 is a flow chart showing the flow of a re-destination deletion process in this embodiment. FIG. 8 is a view showing an example of a login screen 53 to be displayed on a display device 9. When a user enters a user name and a password using a numerical pad 8 or the like while the login screen 53 is displayed, a controller 71 performs a personal identification process and a display controlling section 711 causes the display device 9 to display a user screen (Step S21). If the user carries out facsimile transmission after login (YES in Step S22), the controller 71 causes the re-destination storage 721 to store a fax number of a destination and the logged-in user name (Step S23).

When an input operation unit 6 receives a logout operation from the user (YES in Step S24), the re-destination deleting section 712 discriminates whether or not the logged-out user name is stored in the re-destination storage 721 (Step S25). If the logged-out user name is stored in the re-destination storage 721 (YES in Step S25), the display controlling section 711 causes the display device 9 to display a confirmation screen 52 to let the user confirm whether or not to delete the fax number stored in the re-destination storage 721 (Step S26).

If the user depresses an OK key 64 (YES in Step S27), the re-destination deleting section 712 deletes the fax number and the user name stored in the re-destination storage 721 (Step S28). In other words, even if another user depresses the re-destination key 63 thereafter, no fax number is displayed in an entry field 61 since no fax number is stored in the re-destination storage 721.

Further, if the logged-out user name is not stored in the re-destination storage 721 (NO in Step S25), the fax number stored in the re-destination storage 721 is not the one stored upon facsimile transmission by the logged-out user, but the one stored upon facsimile transmission by another user. Thus, the re-destination deleting section 712 ends the process without deleting the fax number stored in the re-destination storage 721.

If the display controlling section 711 causes the display device 9 to display the confirmation screen 52 after the logout operation and an instruction input to delete the fax number stored in the re-destination storage 721 is received from the user in this way, and the user can arbitrarily delete a fax number stored in the re-destination storage 721. According to this, the user can prevent it from being forgotten to delete the fax number desired not to be known to others. If the user inputs the instruction to delete the fax number stored in the re-destination storage 721, the re-destination deleting section 712 deletes the fax number and the user name used by the user who was logged in, no fax number is displayed even if another user depresses the re-destination key 63 thereafter, wherefore privacy and security can be protected.

In this embodiment, the display controlling section 711 causes the display device 9 to display the confirmation screen 52 after logout and the re-destination deleting section 712 deletes the fax number and the user name stored in the re-destination storage 721 according to the content of the instruction input by the user. However, if the logged-out user name is stored in the re-destination storage 721, the re-destination deleting section 712 may delete the fax number stored in the re-destination storage 721 without receiving any instruction from the user.

The method described in the first embodiment (deletion of the fax number stored in the re-destination storage 721 by pressing the re-destination key 63 long) may be combined with the second embodiment. In other words, if the re-destination key 63 is pressed long as described in the first embodiment when the logged-out user name is stored in the re-destination storage 721, the re-destination deleting section 712 may delete the fax number corresponding to this user name and stored in the re-destination storage 721.

Third Embodiment

A fax number desired not to be known to others is thought to have been deleted many times in the past. Accordingly, in the third embodiment is described a method by which a fax number deleted by a re-destination deleting section 712 and its deletion number, i.e. how often it has been deleted, are stored in a deletion history storage 722, and the re-destination deleting section 712 deletes after discriminating whether or not a fax number of a facsimile transmission destination is a number having been deleted a predetermined number of times or more. Note that an internal construction of the image forming apparatus 1 in the third embodiment is the same as the one shown in FIG. 1 and, hence, not described. Further, an electrical construction of the image forming apparatus 1 is the one shown in FIG. 2 plus an addition of the deletion history storage 722 to the storage 72.

FIG. 9 is a view showing an example of a data configuration of the deletion history storage 722 in this embodiment. The deletion history storage 722 stores deletion numbers in addition to fax numbers deleted in the past.

Figure 10:
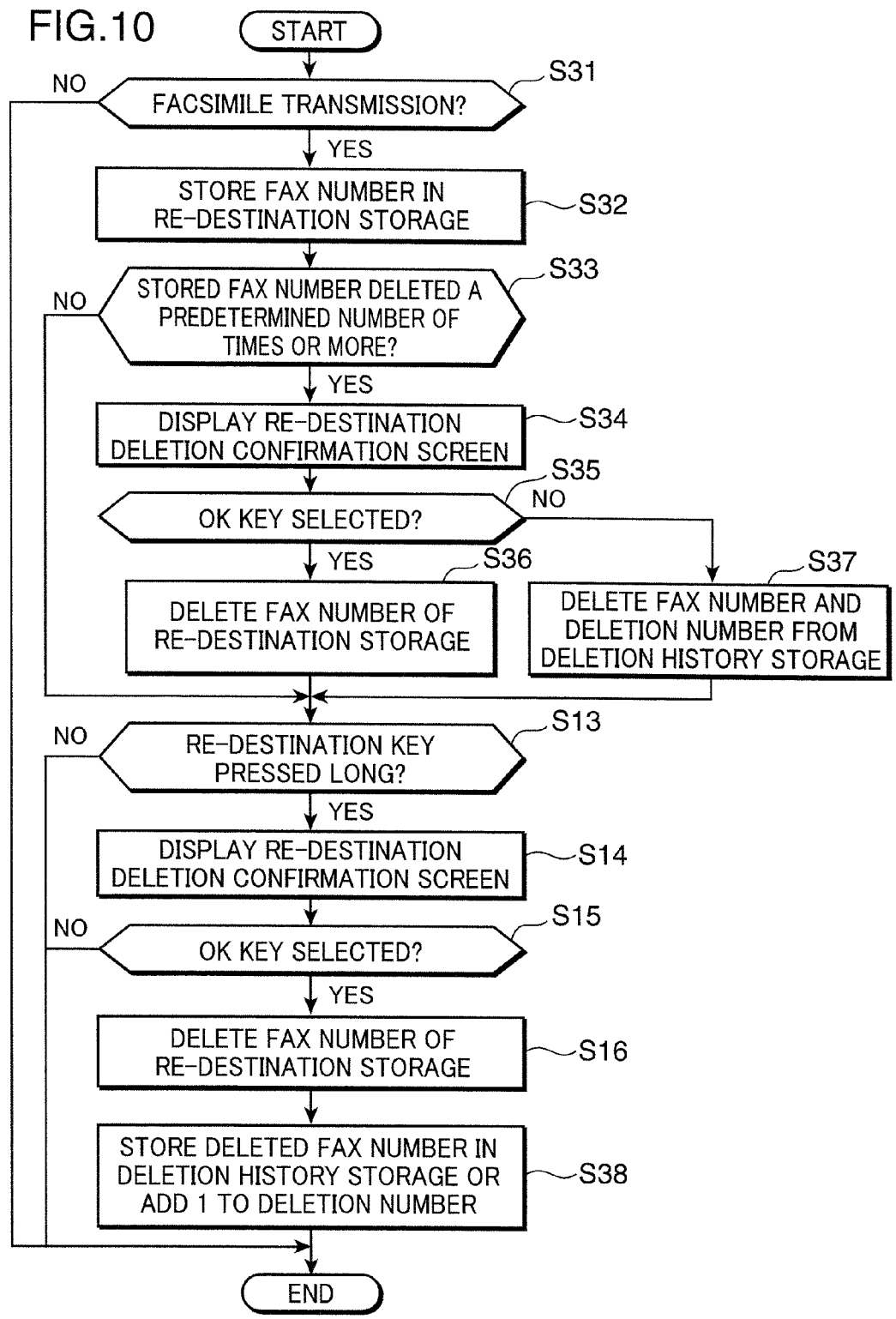
FIG. 10 is a flow chart showing the flow of a re-destination deletion process in the third embodiment.

FIG. 10 is a flow chart showing the flow of a re-destination deletion process in this embodiment. In the case of facsimile transmission (YES in Step S31), a controller 71 causes the re-destination storage 721 to store a fax number of a destination (Step S32). Then, the re-destination deleting section 712 searches whether or not there is any fax number stored in the re-destination storage 721 based on the fax numbers and the deletion numbers added thereto stored in the deletion history storage 722, and reads the deletion number added to this fax number when detecting the fax number. If its deletion number is a predetermined number or larger (YES in Step S33), a display controlling section 711 causes the display device 9 to display a confirmation screen 52 to let a user confirm whether or not to delete the fax number stored in the re-destination storage 721 (Step S34). If the user depresses an OK key 64 (YES in Step S35), the re-destination deleting section 712 deletes the fax number stored in the re-destination storage 721 (Step S36).

For example, it is assumed that the re-destination deleting section 712 deletes fax numbers deleted three or more times in the past and contents shown in FIG. 9 are stored in the deletion history storage 722. If the user carries out facsimile transmission to "03-1234-5678", the re-destination deleting section 712 searches whether or not this fax number is stored in the deletion history storage 722 in Step S33, reads the deletion number added to this fax number (1 in FIG. 9) from the deletion history storage 722 if the fax number is detected from the fax numbers stored in the deletion history storage 722, and judges that this fax number has not been deleted more than three times based on the deletion number stored together with this fax number, and then this routine proceeds to Step S13.

If the user carries out facsimile transmission to "06-1234-5678", the re-destination deleting section 712 searches whether or not this fax number is stored in the deletion history storage 722 in Step S33, and judges that this fax number has been deleted three or more times based on the deletion number (3 in FIG. 9) stored together with this fax number in the deletion history storage 722 in the case of detecting this fax number from the fax numbers stored in the deletion history storage 722. Then, the display controlling section 711 causes the display device 9 to display the confirmation screen 52 to let the user confirm whether or not to delete.

If the user depresses a cancel key 65 while this confirmation screen 52 is displayed (NO in Step S35), the controller 71 deletes the fax number and its deletion number stored in the re-destination storage 721 from the deletion history storage 722 (Step S37). Note that this processing in Step S37 may not be performed.

Thereafter, if the user presses the re-destination key 63 long (YES in Step S13), the re-destination deleting section 712 judges that the re-destination key 63 was pressed long and the display controlling section 711 causes the display device 9 to display the confirmation screen 52 to let the user confirm whether or not to delete the fax number stored in the re-destination storage 721 (Step S14).

If the user presses the OK key 64 (YES in Step S15), the re-destination deleting section 712 deletes the fax number stored in the re-destination storage 721 (Step S16). Then, the controller 71 causes the deletion history storage 722 to store the fax number deleted by the re-destination deleting section 712. Alternatively, if this fax number is already stored in the deletion history storage 722, the deletion number is updated and stored by adding 1 to the deletion number stored together with the fax number (Step S38).

As described above, by the re-destination deleting section 712 deleting the fax number stored in the re-destination storage 721 if the fax number stored in the re-destination storage 721 has been deleted the predetermined number of times or more, the fax number desired not to be known to others by the user can be reliably deleted. Even if another user depresses the re-destination key 63 thereafter, no fax number is displayed, whereby privacy and security can be protected.

In this embodiment, the display controlling section 711 causes the display device 9 to display the confirmation screen 52 to let the user confirm whether or not to delete the fax number stored in the re-destination storage 721 when the deletion number of the fax number stored in the re-destination storage 721 is the predetermined number or larger or when the re-destination key 63 is pressed long. However, the re-destination deleting section 712 may delete the fax number stored in the re-destination storage 721 without this confirmation screen 52 being displayed.

Fourth Embodiment

It is thought that a fax number desired not to be known to others has been deleted many times in the past and such a fax number differs from user to user. Accordingly, in the fourth embodiment is described a method by which a fax number deleted by a re-destination deleting section 712, its deletion number, and a user name who instructed the deletion are stored in a deletion history storage 722, and the re-destination deleting section 712 deletes after discriminating whether or not a fax number of a facsimile transmission destination is the one that has been deleted a predetermined number of times or more at every user name. Note that an internal construction of an image forming apparatus 1 in the fourth embodiment is the same as the one shown in FIG. 1 and, hence, not described. An electrical construction of the image forming apparatus 1 is the one shown in FIG. 2 plus an addition of a deletion history storage 722 to the storage 72.

FIG. 11 is a view showing an example of a data configuration of the deletion history storage 722 in this embodiment. The deletion history storage 722 stores, in addition to a fax number deleted in the past, its deletion number and a user name who instructed to delete this fax number.

FIG. 12 is a flow chart showing the flow of a re-destination deletion process in this embodiment. If a user enters a user name and a password using a numerical pad 8 or the like while the login screen 53 shown in FIG. 8 is displayed, a controller 71 performs a personal identification process and a display controlling section 711 causes the display device 9 to display a user screen (Step S21). If the user carries out facsimile transmission after login (YES in Step S22), the controller 71 causes the re-destination storage 721 to store a fax number and the logged-in user name (Step S23).

Subsequently, the re-destination deleting section 712 searches the fax number stored in the re-destination storage 721 from those stored in the deletion history storage 722, and reads a deletion number and a user name stored together with this fax number in the case of detecting the fax number. If the read deletion number is the predetermined number or larger and the user name is the one stored in the re-destination storage 721 (YES in Step S41), the display controlling section 711 causes a display device 9 to display a confirmation screen 52 to let the user confirm whether or not to delete the fax number stored in the re-destination storage 721 (Step S34). If the user depresses an OK key 64 (YES in Step S35), the re-destination deleting section 712 deletes the fax number stored in the re-destination storage 721 (Step S36).

For example, it is assumed that the re-destination deleting section 712 deletes fax numbers deleted three or more times in the past and contents shown in FIG. 11 are stored in the deletion history storage 722. If a user currently logged-in with a user name "ABC" carries out facsimile transmission to "03-1234-5678", the re-destination deleting section 712 detects "03-1234-5678" in the deletion history storage 722. A "detection number: 1" and a "user name: ABC" are stored together with "03-1234-5678" in the deletion history storage 722. Here, the re-destination deleting section 712 judges that "03-1234-5678" has not been deleted three or more times in the past and this routine proceeds to Step S24.

Likewise, if the user currently logged-in with the user name "ABC" carries out facsimile transmission to "06-1234-5678", the re-destination deleting section 712 detects "06-1234-5678" in the deletion history storage 722. A "detection number: 3" and the "user name: PQR" are stored together with "06-1234-5678" in the deletion history storage 722. Here, the re-destination deleting section 712 judges that the user name stored together with "06-1234-5678" is not "ABC" and this routine proceeds to Step S24. If the user name who instructed deletion three or more times is not the one of the currently logged-in user even thought the fax number stored in the re-destination storage 721 has been deleted three or more times in the past, the re-destination deleting section 712 deletes neither the fax number nor the user name stored in the re-destination storage 721.

Further, if a user currently logged-in with the user name "PQR" carries out facsimile transmission to "06-1234-5678", the re-destination deleting section 712 detects "06-1234-5678" in the deletion history storage 722. The "detection number: 3" and the "user name: PQR" are stored together with "06-1234-5678" in the deletion history storage 722. The re-destination deleting section 712 judges that "06-1234-5678" has been deleted three or more times in the past and the user name stored together with this deletion number is "PQR" which is the user name of the currently logged-in user. Then, the display controlling section 712 causes the display device 9 to display the confirmation screen 52 to let the user confirm whether or not to delete.

If the user depresses a cancel key 65 while this confirmation screen 52 is displayed (NO in Step S35), the controller 71 deletes the fax number, which is the one stored in the re-destination storage 721 and stored together with the user name in the re-destination storage 721, from the deletion history storage 722 and further deletes the deletion number and the user name stored together with this fax number (Step S47). Note that this processing in Step S47 may not be performed.

When an input operation unit 6 receives a logout operation from the user (YES in Step S24), the re-destination deleting section 712 discriminates whether or not the logged-out user name is stored in the re-destination storage 721 (Step S25). If the logged-out user name is stored in the re-destination storage 721 (YES in Step S25), the display controlling section 711 causes the display device 9 to display the confirmation screen 52 to let the user confirm whether or not to delete the fax number stored in the re-destination storage 721 (Step S26). If the user depresses the OK key 64 (YES in Step S27), the re-destination deleting section 712 deletes the fax number and the user name stored in the re-destination storage 721 (Step S28).

Further, if the logged-out user name is not stored in the re-destination storage 721 (NO in Step S25), the fax number stored in the re-destination storage 721 is not the one stored upon facsimile transmission by the logged-out user, but the one stored upon facsimile transmission by another user. Thus, the re-destination deleting section 712 ends the process without deleting the fax number stored in the re-destination storage 721.

As described above, if fax numbers deleted in the past, their deletion numbers and user names who instructed deletion are stored in the deletion history storage 722 and a currently logged-in user has instructed to delete a fax number of a facsimile transmission destination the predetermined number of times or more in the past, the fax number to be deleted can be discriminated for each user and deleted by the re-destination deleting section 712 deleting the fax number and the user name stored in the re-destination storage 721. Accordingly, the fax number desired not to be known to others by the logged-out user can be reliably deleted and, even if another user depresses the re-destination key 63 thereafter, no fax number is displayed, wherefore privacy and security can be protected.

Note that the method described in the first embodiment (deletion of the fax number stored in the re-destination storage 721 by pressing the re-destination key 63 long) may be combined with this fourth embodiment. In other words, if the logged-out user is stored in the re-destination storage 721, the currently logged-in user has instructed to delete the fax number stored together with this user name in the re-destination storage 721 the predetermined number of times or more in the past and the re-destination key 63 described in the first embodiment is pressed long, the re-destination deleting section 712 may delete the fax number corresponding to this user name and stored in the re-destination storage 721.

Further, in this embodiment, if the logged-out user has instructed to delete the fax number stored in the re-destination storage 721 the predetermined number of times or more, the display controlling section 711 causes the display device 9 to display the confirmation screen 52 to let the user confirm whether or not to delete the fax number stored in the re-destination storage 721. However, the re-destination deleting section 712 may delete the fax number stored in the re-destination storage 721 without this confirmation screen 52 being displayed.

Fifth Embodiment

In a fifth embodiment is described a method by which a user can set beforehand whether or not to delete a fax number stored in a re-destination storage 721 on an initial setting screen (system menu screen). Note that an internal construction and an electrical construction of an image forming apparatus 1 in the fifth embodiment are the same as those shown in FIGS. 1 and 2 and, hence, not described.

FIG. 13 is a view showing an example of an initial setting screen 54 to be displayed on a display device 9. The initial setting screen 54 is one of a plurality of initial setting screens, and system settings relating to a general operation of an image forming apparatus 1 such as copy setting and transmission setting can be performed on other initial setting screens. Further, the system setting of the image forming apparatus 1 by the initial setting screen 54 may be arbitrarily set by any user or may be set only by an authorized user.

Radio buttons 66, 67 used to enter instructions whether or not to delete are displayed together with a message saying that "delete re-destination information?" on the initial setting screen 54. A user selects to enter a check mark in the radio button 66 and depresses an OK key 68 if he wants to delete a fax number stored in a re-destination storage 721. By this, a controller 71 sets to delete the fax number stored in the re-destination storage 721 as initial setting relating to transmission.

FIG. 14 is a flow chart showing the flow of a re-destination deletion process in this embodiment. In the case of facsimile transmission (YES in Step S11), the controller 71 causes the re-destination storage 721 to store a fax number of a facsimile transmission destination (Step S12). Here, if the initial setting to the effect of deleting the fax number stored in the re-destination storage 721 is already made (YES in Step S51), a display controlling section 711 causes the display device 9 to display a confirmation screen 52 to let the user confirm whether or not to delete the fax number stored in the re-destination storage 721 (Step S14). If the user depresses an OK key 64 (YES in Step S15), a re-destination deleting section 712 deletes the fax number stored in the re-destination storage 721 (Step S16).

In this way, if it is not desired to let others know a fax number of a facsimile transmission destination, the re-destination deleting section 712 reliably deletes the fax number stored in the re-destination storage 721 even if the user forgets to delete the fax number by setting on the initial setting screen 54 to the effect of deleting the fax number stored in the re-destination storage 721. Therefore, privacy and security can be protected.

In this embodiment, if the initial setting to the effect of deleting the fax number stored in the re-destination storage 721 is made in advance, the display controlling section 711 causes the display device 9 to display the confirmation screen 52 to let the user confirm whether or not to delete the fax number stored in the re-destination storage 721. However, the re-destination deleting section 712 may delete the fax number stored in the re-destination storage 721 without this confirmation screen 52 being displayed.

This application is based on Japanese Patent application serial No. 2009-264647 filed in Japan Patent Office on Nov. 20, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus, comprising:
   a reading unit that reads a document image to obtain an image data;
   an identification information receiving unit that receives an input of identification information of an external apparatus as a destination of the image data;
   a transmission unit that transmits the image data to the external apparatus indicated by the identification information received by the identification information receiving unit;
   a re-destination storage that stores the identification information used for the image data transmission to the external apparatus by the transmission unit as a destination candidate of next image data transmission by the transmission unit;
   a re-destination key for calling up the identification information;
   a display controlling section that causes a display device to display a first identification information when the re-destination key is depressed, the first identification information being identification information stored in the re-destination storage and being used for a most recent image data transmission; and
   a deleting section that deletes the first identification information stored in the re-destination storage when a predetermined condition is satisfied, wherein
   the predetermined condition includes a condition where a predetermined operation on the re-destination key is performed, the predetermined operation being different from the depression of the re-destination key for calling up the identification information.

2. An image reading apparatus comprising:
   a reading unit that reads a document image to obtain an image data;
   an identification information receiving unit that receives an input of identification information of an external apparatus as a destination of the image data;
   a transmission unit that transmits the image data to the external apparatus indicated by the identification information received by the identification information receiving unit;
   a re-destination storage that stores the identification information used for the image data transmission to the external apparatus by the transmission unit as a destination candidate of next image data transmission by the transmission unit;
   a re-destination key for calling up the identification information;
   a display controlling section that causes, a display device to display a first identification information when the re-destination key is depressed, the first identification information being identification information stored in the re-destination storage and being used for a most recent image data transmission;
   a deleting section that deletes the first identification information stored in the re-destination storage when a predetermined condition is satisfied;
   a login receiving section that receives an input of user information for login; and a logout receiving section that receives an input of a logout instruction, wherein:

the re-destination storage stores user information of a user, who was logged in when the identification information receiving unit received the input of the identification information, in addition to the identification information upon storing the identification information;

the predetermined condition includes a condition where an operation of the logout receiving section that receives the input of the logout instruction is performed after the image data transmission; and the deleting section deletes the first identification information stored in the re-destination storage and having the user information of the user, who was logged in when the logout receiving section received the input of the logout instruction, added thereto.

3. An image reading apparatus according to claim 1, further comprising a deletion history storage that stores a deletion number of a first identification information that is the same as the first identification information in addition to the first identification information deleted from the re-destination storage by the deleting section, wherein:

the deleting section judges, when the first identification information is stored in the re-destination storage, whether or not the deletion number of the first identification information that is the same as the first identification information stored in the deletion history storage is a predetermined number or larger, and if it is judged that the deletion number is the predetermined number or larger, the deletion section determines the first identification information stored in the re-destination storage as a target of deletion without requiring the condition that a predetermined operation on the re-destination key that is different from the depression of the re-destination key for calling up the identification information is performed.

4. An image reading apparatus according to claim 2, further comprising:

a deletion history storage that stores a deletion number of a first identification information that is the same as the first identification information and user information of a user, who was logged in when the first identification information was deleted, in addition to the first identification information deleted from the re-destination storage by the deleting section, wherein the deleting section judges, when the first identification information is stored in the re-destination storage, whether or not the deletion number of the first identification information that is the same as the first identification information stored in the deletion history storage is a predetermined number or larger, and if it is judged that the deletion number is the predetermined number or larger, the deletion section determines the first identification information stored in the re-destination storage as a target of deletion without requiring the condition that the logout receiving section receives the input of the logout instruction.

5. An image reading apparatus comprising:

a reading unit that reads a document image to obtain an image data;

an identification information receiving unit that receives an input of identification information of an external apparatus as a destination of the image data;

a transmission unit that transmits the image data to the external apparatus indicated by the identification information received by the identification information receiving unit;

a re-destination storage that stores the identification information used for the image data transmission to the external apparatus by the transmission unit as a destination candidate of next image data transmission by the transmission unit;

a re-destination key for calling up the identification information;

a display controlling section that causes, a display device to display a first identification information when the re-destination key is depressed, the first identification information being identification information stored in the re-destination storage and being used for a most recent image data transmission;

a deleting section that deletes the first identification information stored in the re-destination storage when a predetermined condition is satisfied;

a delete selection receiving section that receives an input of selection as to whether or not to delete the first identification information stored in the re-destination storage as an initial setting operation that sets an operation of the image reading apparatus; and a setting section that sets whether or not to delete the first identification information stored in the re-destination storage according to the input of selection received by the delete selection receiving section, wherein:

the predetermined condition includes a condition that a setting to delete the first identification information is made already in the setting section; and the deleting section deletes the first identification information stored in the re-destination storage when the image data is transmitted with the predetermined condition satisfied, the first identification information being identification information used for the image data transmission.

6. An image reading apparatus according to claim 1, wherein:

the display controlling section causes the display device to display a message as to whether or not to delete the first identification information before the predetermined condition on the re-destination key that is different from the depression of the re-destination key for calling up the identification information is performed and the deleting section deletes the first identification information from the re-destination storage;

the image reading apparatus further comprises a selection receiving section that receives an input of selection as to whether or not to delete the first identification information, for which the message as to whether or not to delete was displayed on the display device by the display controlling section; and the deleting section deletes the first identification information stored in the re-destination storage when the selection receiving section receives the input of selection to delete the first identification information.

7. An image forming apparatus, comprising:

an image reading apparatus according to claim 1, and an image forming unit that forms an image on a sheet based on the image data.

* * * * *